Jan. 31, 1939. G. MUFFLY 2,145,773
REFRIGERATOR AND METHOD AND APPARATUS FOR FREEZING ICE
Filed Nov. 8, 1933 4 Sheets-Sheet 1
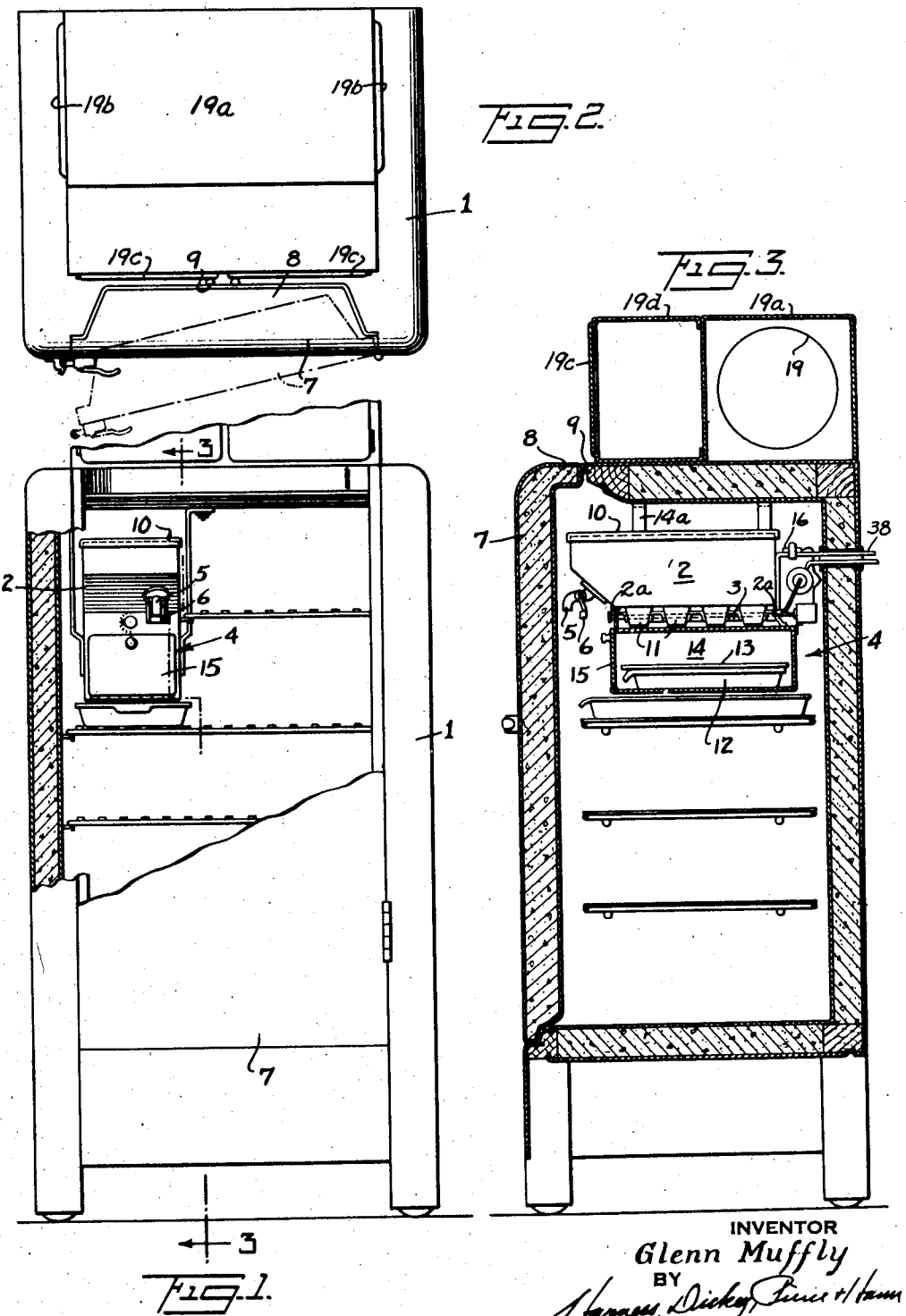
INVENTOR
Glenn Muffly
BY
ATTORNEYS

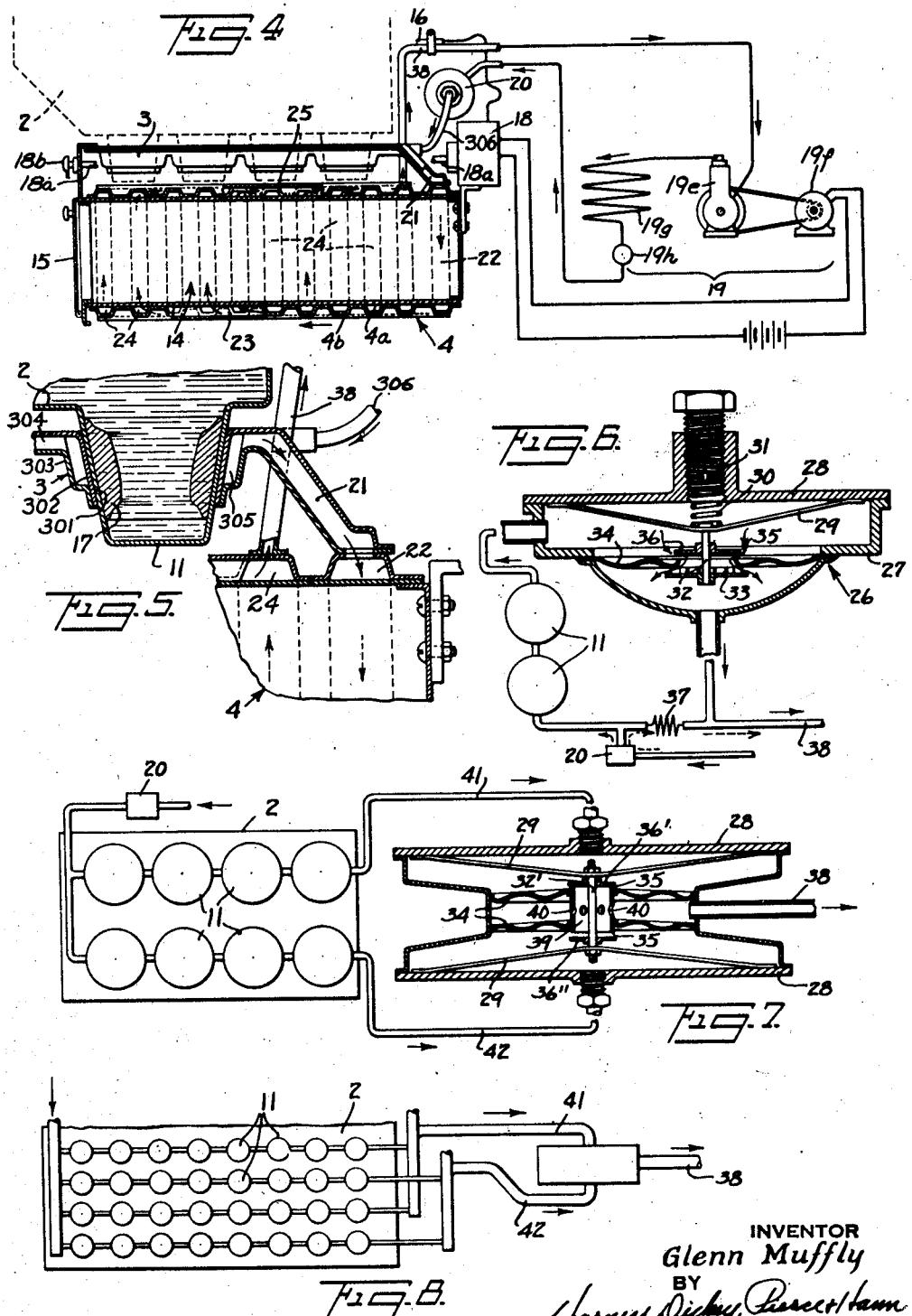

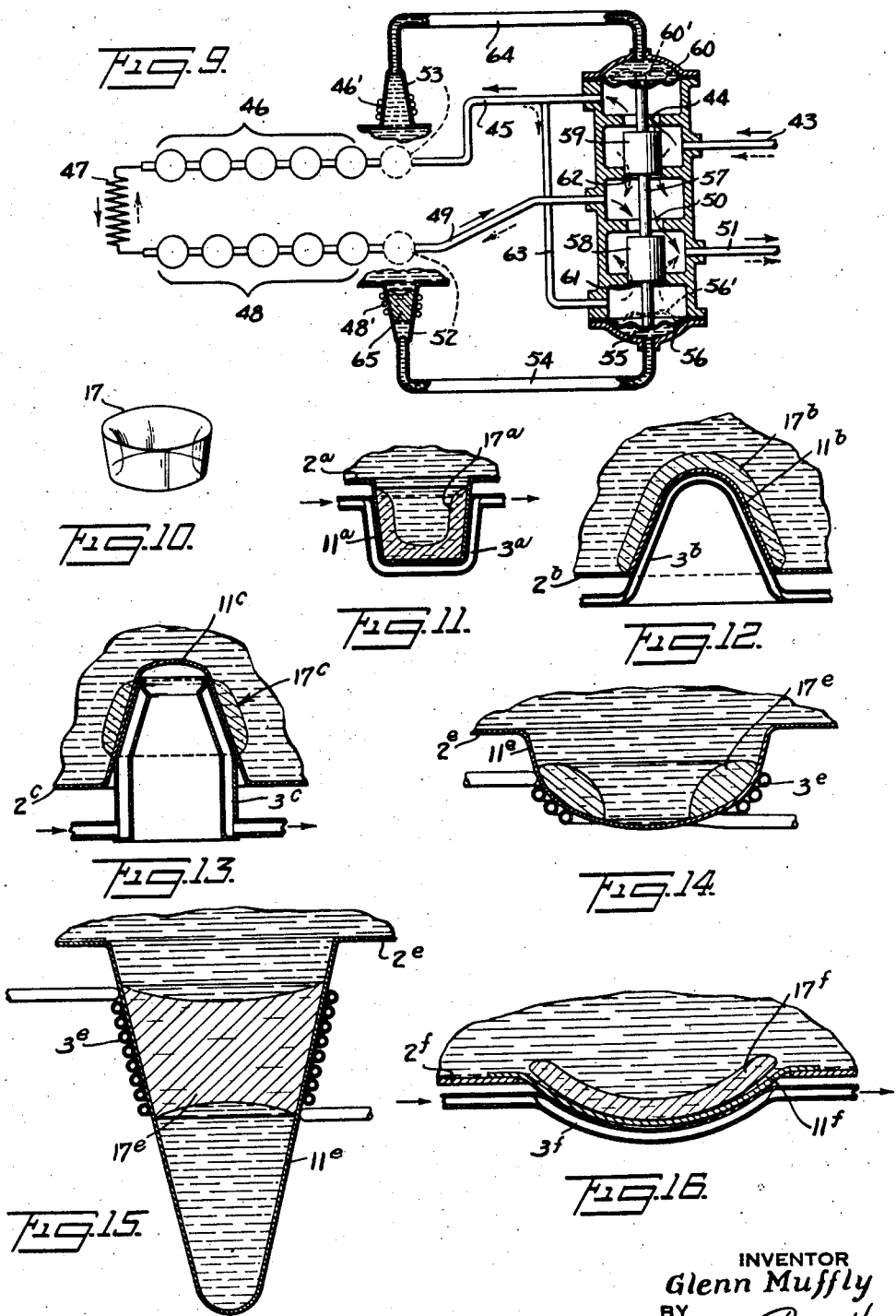

Jan. 31, 1939.  G. MUFFLY  2,145,773
REFRIGERATOR AND METHOD AND APPARATUS FOR FREEZING ICE
Filed Nov. 8, 1933  4 Sheets-Sheet 4
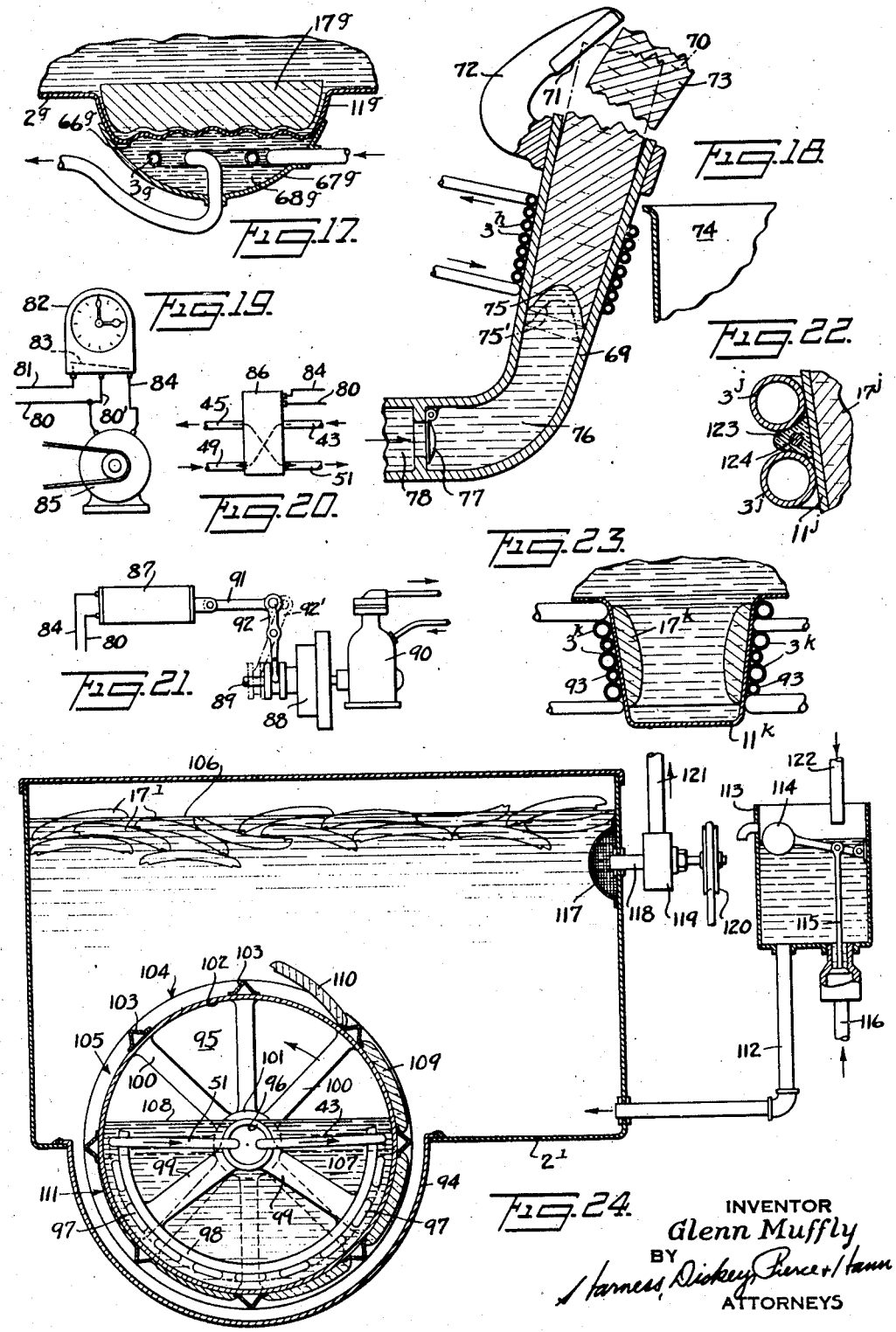
INVENTOR
Glenn Muffly
BY
Harness, Dickey, Pierce & Mann
ATTORNEYS Patented Jan. 31, 1939

2,145,773

UNITED STATES PATENT OFFICE 2,145,773

REFRIGERATOR AND METHOD AND APPARATUS FOR FREEZING ICE

Glenn Muffly, Eastchester, N. Y.

Application November 8, 1933, Serial No. 697,124

29 Claims. (Cl. 62—105)

This invention relates to mechanical refrigerators and particularly to methods and apparatus for freezing ice, and more particularly to methods for causing the ice to free itself from the surface upon which it has been frozen in order that more ice may be frozen upon the same surface while the first formed ice is stored for later use.

An object of this invention is to provide a greater and more readily accessible supply of ice in a mechanically cooled refrigerator.

Another object is to freeze blocks of ice in new and more attractive shapes.

Another object is to provide thermally actuated means for loosening the ice from the surface upon which it has been frozen and thus eliminate the need for any power driven mechanism other than the refrigerating system itself.

Another object is to produce clear ice, which is more attractive than the clouded, crackled or opaque ice that is now frozen in ice cube form in mechanical refrigerators.

Another object is to provide a storage tank of iced drinking water in which the ice is automatically replenished at a rate in excess of the requirements for keeping the water properly cooled, so that the floating ice blocks are available for other uses without the labor of breaking ice loose from trays and grids and without the trouble of breaking the trays themselves loose, washing them, refilling them and replacing them in the freezing element.

Another object is to store ice blocks in such a manner that they will not collect frost and other condensed vapors, nor partially melt and then freeze together, as ordinarily happens according to the storage temperature in conventional structures.

A further object is to provide means for storing a large reserve of refrigerating effect in the form of ice, while keeping the freezing surfaces free from the usual thick coating of ice which interferes with the freezing of more ice on such surfaces. A still further object is to supply iced water in large quantities for air conditioning systems to provide a greater peak-demand capacity than is provided by the refrigerating system employed, accumulating refrigerating effect in the form of small ice blocks of relatively great area during periods of lesser demand for refrigeration.

The above being among the objects of the present invention, the same consists in certain novel features of construction, combinations of parts and steps of operation that will hereinafter be described with reference to the accompanying drawings, and then claimed, having the above and other objects in view.

In the accompanying drawings which illustrate suitable embodiments of the present invention, and in which like numerals refer to like parts throughout the several different views, Figure 1 is a partially broken, partially sectioned front elevational view of a mechanical refrigerator cabinet, showing the ice and water storage tank and other parts of the refrigerating system contained therein.

Fig. 2 is a top plan view of the cabinet shown in Fig. 1.

Fig. 3 is a vertical sectional view of the cabinet taken on the line 3—3 of Fig. 1.

Fig. 4 is an enlarged partially broken, partially sectioned side view of the assembly of the cooling elements of the refrigerating system shown in preceding views, showing the refrigerant circulating system in diagram and showing one method of thermostatic control and adjustment.

Fig. 5 is an enlarged, fragmentary, vertical sectional view taken centrally through one of the ice-making cups shown in Figs. 3 and 4, showing also the portion of evaporator which cools this cup and a small portion of the evaporator which cools the cabinet.

Fig. 6 is a vertical sectional view taken centrally through a thermostatic valve used in an alternative method of control for the refrigerating system shown in the previous views, together with a diagram of a portion of the refrigerating system circuit.

Fig. 7 is a view similar to Fig. 6 but illustrating a modified form of construction including a somewhat similar thermostatic valve of dual design, with a corresponding diagrammatic illustration of the ice-water tank and freezing cups.

Fig. 8 is a diagrammatic illustration of a larger ice-water tank with connections, as might be used in an air conditioning system or a large system for supplying ice water, as in a hotel.

Fig. 9 is a fragmentary sectional view taken centrally through a valve for producing reversals of refrigerant movement through the cooperating evaporators associated with two sets of ice-making cups, and illustrating a novel method of providing power for the operation of the reversing valve.

Fig. 10 is a perspective view of one form of ice ring produced by the method herein described.

Fig. 11 is a fragmentary sectional view taken centrally through a modified form of ice-making cup and associated evaporator, and showing the resulting ice block in the form of a cup.

Fig. 12 is a view similar to Fig. 11 but illustrating another variation of the ice cup, making a cup of ice on the outside of the cup but inside of the tank.

Fig. 13 is a view similar to Fig. 11 but illustrating an ice cup and evaporator arranged to produce a ring of ice on the outer wall of an inverted cup.

Fig. 14 is a view similar to Fig. 11 but illustrating a modified form of ice cup with a tubular evaporator, designed to produce an ice ring of different form.

Fig. 15 is a view similar to Fig. 11 but illustrating still another form of ice cup in which a block of ice is so frozen that pressure is produced in the lower part of the cup for the purpose of ejecting the ice.

Fig. 16 is a view similar to Fig. 11 but illustrating an ice cup designed to free itself of ice in still another manner, employing thermal contraction of metal instead of expansion due to freezing of ice.

Fig. 17 shows an ice cup with diaphragm bottom and an alternative method of ejecting ice.

Fig. 18 shows an ice freezing chamber supplied with water from the bottom and having means for breaking ice into short lengths as it is ejected or extruded.

Fig. 19 is a wiring diagram, showing means for interrupting the operation of freezing means on a time cycle.

Fig. 20 is a diagrammatic illustration of an electrically operated valve similar to the valve in Fig. 9.

Fig. 21 illustrates a time operated clutch or other mechanical device for stopping and starting refrigeration.

Fig. 22 illustrates an arrangement of the ice cup, evaporator and electrical heating element for alternately freezing ice and heating the cup to free the ice.

Fig. 23 is another view of an ice cup, showing a coil of tubing for a fluid heating medium in place of the electrical heating element.

Fig. 24 illustrates a further variation of the general principle of utilizing natural forces obtained as by-products of the refrigerating system for the purpose of separating the ice from the surface upon which it has been frozen. This view also shows in more detail the method of employing a tank of ice and water, as described in connection with Fig. 8, in a cold water supply system, an air conditioning system, etc.

Before entering into a detailed description of the present invention and the methods and apparatus hereafter described for use in connection therewith, a brief description of the salient points of the invention will be of aid in the more ready understanding of the specific apparatus provided as well as the method of operation thereof. The present invention deals primarily with the production of ice by artificial means and the making of such ice available preferably in the form of relatively small masses without the necessity of manually or mechanically freeing them from the particular container in which they are formed. By the terms "water" and "ice", as herein employed it is to be understood that "water" is to include water or other freezable liquid which it is desired to freeze, and "ice" the frozen form of such liquid. Preferably, the water which is to form the ice is frozen in containers of a size which will provide ice masses of a size convenient for usual household use, as for instance in water glasses, although it is to be understood that this feature is not necessary particularly when it is desired to put the ice to a different use. The most important feature of the present invention is the means and/or method provided for automatically freeing such masses of ice from the container in which they are frozen and to so position them as to make them readily available for use, and particularly for a method and apparatus in which no mechanically operated means are necessary to free the masses of ice from their containers and to move them to a position in which they are readily available for use. The present invention contemplates the use of either or a combination of three different methods of freeing a mass from its container, one of which includes the melting of a film of ice between the mass of ice and its forming surface or container, another of which involves the forceful separation of the ice from its forming surface or container by expansive energy built up by the freezing of the ice, and the third of which involves the separation of the ice from its forming surface or container by the thermal flexing of such surface or container. It also involves the subsequent removal of the ice from the container and moving it to a place of ready accessibility by either one or a combination of two different forces, one of which is the difference in buoyancy of the frozen and liquid water or other material acted upon, and the second of which is the expansive energy set up by the freezing of the material.

It is to be noted that although the broader features of the present invention are capable of use solely as a means for providing a ready supply of readily available masses of ice and may so be employed, a more limited phase of the present invention is the combination of such ice supply means with a refrigerating cabinet or refrigerator of the type conventionally employed for household purposes in which case a single refrigerating unit may be employed both as a means for providing the necessary refrigerating effect for making the ice and also for maintaining the temperature of the interior of the refrigerator at the desired low value.

It may also aid in the ready understanding of the invention to understand at this point that perhaps the simplest form of the ice-making feature of the present invention includes a tank containing a liquid to be frozen, which tank has one or more areas which may be in the form of a cup, a protuberance or simply a flat or other surface provided with an associated refrigerant evaporating element of such proportions and capacity as to cause a portion of the water in the tank to be frozen upon such surface during such times that the evaporator connected therewith is operative, that is, exerting a refrigerating effect, and such that when the evaporator connected therewith is inoperative or not exerting a refrigerating effect the bond between it and the ice frozen upon it will melt and free the ice therefrom, whereupon the buoyancy of the ice on the water contained in the tank will cause the ice to float to the top of the water in a position to be readily picked up, and will leave the refrigerating surface in a condition to freeze another mass of ice upon it during the next active period of the cooperating evaporator.

Referring to Figs. 1, 2 and 3, a refrigerator cabinet is indicated generally at 1 and as having wall sections suitably insulated as in conventional constructions to reduce the amount of heat transfer through them. As in conventional constructions the front of the cabinet 1 is provided with a swingable door but in this particular case an important difference between the present construction and the existing constructions of this sort is best illustrated in Figs. 2 and 3 where it is seen that the door 7 is provided at its top with an inwardly turned projecting portion or L of material depth indicated at 8. This portion 8 at the top of the door projects into and closes the complementary recess 9 in the top wall of the cabinet 1.

Supported in the interior of the cabinet from the top wall thereof as by strap-like brackets 14a is an evaporator generally indicated at 4 forming a sharp freezing chamber indicated at 14. A tray 12 may be provided in the chamber 14 and may be covered by a flat sheet of metal or plate 13 so that other articles may be supported upon it. While this tray may be used for freezing ice, it is intended mainly for freezing desserts or other special compounds while clear water is frozen by additional means hereinafter described. A water tank, indicated generally in Figs. 1 and 3 as at 2, is removably supported in spaced relation above the evaporator 14 by means which will hereinafter be more fully pointed out, the removable top 10 of the water tank 2 being normally downwardly spaced from the bottom surface of the top wall of the cabinet 1. Formed in or fixed to the lower surface of the water tank, and open at their top to the interior thereof, are a plurality of cups, indicated generally in Fig. 3 as at 11, these cups projecting downwardly into the space between the bottom of the water tank 2 and the top of the evaporator 14. Preferably two or more rows of these cups 11 are provided on the bottom of the tank 2, two rows being considered as employed in the constructions illustrated in Figs. 1 to 7 inclusive. Means are provided to refrigerate at least a portion of the surface of the cups 11 so as to cause at least a portion of the water from the tank 2 which fills them to be frozen. Such means may comprise a second or auxiliary evaporating unit indicated generally in Fig. 3 as at 3, this second unit being fixed to the top of the evaporator 4 as by legs 2a and having openings therein the inner walls of which are complemental to the outer walls of the cups 11, and the engagement between the cups 11 and the walls of such openings serves as a means for removably supporting the weight of the water tank 2 from the evaporator 4.

The condensing unit, which is generally indicated at 19 in Fig. 3, is preferably mounted upon the top wall of the cabinet 1 and preferably enclosed in a suitable sheet metal housing 19a having suitable openings such as the louvres 19b at each end thereof as illustrated in Fig. 2 to permit the circulation of air therethrough. It is also desirable to provide on the top wall of the cabinet 1 in advance of the housing 19a a second housing 19d, separated from the housing 19a by a metallic wall common to both, and provided with doors 19c on its forward face to permit access to its interior. The compartment provided by this last-named housing 19d may be advantageously employed for warm, dry storage of cereals or other material advantageously affected by the type of atmosphere therein provided.

Now referring to Fig. 3 it will be noted that the forward portion of the water tank 2 projects to a point under the recess 9 in the top wall of the cabinet, this feature making the opening in the top of the tank accessible for removal of ice blocks from the tank and for pouring water into the tank. The cover 10 rests loosely on the top of the tank 2 and may be lifted off or pushed to the rear when it is desired to add water to or to remove ice from the tank. It is also to be noted that the tank 2 projects forwardly beyond the forward end of the evaporator 4 and that the lower front corner of the tank 2 is beveled off and provided with a water faucet 5 which has an operating lever 6 in position to open the faucet when a glass, pitcher or other vessel is pushed rearwardly against it from the front. By reason of the faucet 5 being positioned forwardly in advance of the forward wall of the evaporator 4, it will be evident that a glass or other receptacle may be positioned below the faucet in order to receive water from it without interference from the evaporator 4. When it is desired to remove the water tank 2 from the cabinet for cleaning or other purposes, it is only necessary to defrost the evaporator 3 sufficiently to melt any ice or frost which may bond it to the cups 11, then lift the tank 2 upwardly to bring the cups 11 clear of the evaporator 3 and then pull it forwardly out of the cabinet.

Referring now to Figs. 4 and 5 and particularly to Fig. 5, the openings 301 in the upper evaporator 3 in which the cups 11 are received are clearly brought out together with the relation between the cups and the evaporator 3. It will also be noted that the evaporator 3 is made out of two sheets of metal 302 and 303 suitably formed and secured as by welding to form an annular chamber 304 of material depth surrounding each of the openings 301; and between the chambers 304 are formed to provide passages 305 which connect the chambers 304 in series. As before noted, the cups 11 and consequently the openings 301 in the evaporator 3 in the particular embodiment shown are arranged in two adjacent rows and in the construction shown refrigerant is introduced into the passage 305 at the rear of one of the rows by means of a tube 306 from which it passes forwardly successively through the various chambers 304 in such row to the forward end of the evaporator 3 and then crosses over to the other row and passes successively through the various chambers 304 thereof to the rear end of the evaporator 3 from which it is discharged through the passage 21 to the evaporator 4.

Although, in the broader aspects of the present invention, any suitable or conventional type of evaporator 4 may be employed, the particular form shown by way of illustration includes an inner plain tubular sleeve 4a and an outer cooperating sleeve 4b in which grooves or corrugations are formed so as to provide refrigerant passages between the two sleeves. In the particular construction shown the rear end of the outer sleeve 4b is formed to provide a continuous passage 22 which extends around it from top to bottom thereof where it connects with a longitudinally extending passage 23 extending the full length of the evaporator 4. The longitudinally extending passageway 23 communicates with the bottom of a plurality of passages 24 extending around the evaporator 4 and all of which forwardly of the passages 22 communicate at their upper ends with a longitudinally extending passage 25, which, at its rear end, is connected to a suction tube 38.

With the construction above described liquid refrigerant introduced into the evaporator through the tube 306 flows first through the chambers 305 surrounding the cups 11 and then into the evaporator 4, the refrigerant being gradually vaporized in its passage until when it is discharged through the tube 38 it has been completely changed to gaseous state. The refrigerant, in first passing through the evaporator 3 during each cycle of operation of the refrigerating mechanism, will cause the evaporator 3 to be refrigerated to a relatively greater degree than the evaporator 4 and consequently will act to quickly freeze the water in the cups 11 over the area of contact between the cups 11 and the evaporator 3. Such water frozen in the cups 11 will, during the active period of each cycle of operation of the refrigerating mechanism, build up as a ring of ice such as 17, indicated in Fig. 5, and should the refrigerating effect exist for a sufficiently long time it will be apparent that the ring 17 will eventually become a disc. Preferably, however, the relative size of the chambers 305 and the diameters of the cups 11 are so proportional that the ring 17 will not build up into a complete disc during the active period of one cycle of operation of the refrigerating unit, that is, while the refrigerating mechanism is operating on an active period as differentiated from an off period.

It will be apparent that the evaporator 3, in being open to the free circulation of air in the cabinet 1, will aid in cooling the air in the cabinet and, further, that when a sufficiently low temperature or other predetermined condition has been created in the cabinet or the refrigerating mechanism, according to the type of control employed, to cause the refrigerating mechanism to stop operation, the air in circulating about the evaporator 3 will relatively quickly warm up the evaporator 3 and the walls of the cup 11 embraced thereby to a sufficient extent as to melt the outer film of the ice rings 17, whereupon the natural buoyancy of the rings 17 in the water within the tank 2 will cause them to float upwardly to the top of the tank. It will, of course, be understood that the cyclic operation of the refrigerating mechanism must be such as to permit a sufficient time element for this melting and freeing of the ice rings 17 to occur during the off period of the refrigerating mechanism in order to realize the full advantages of the present invention.

Any suitable type of refrigerating mechanism having suitable cyclic operation and having any suitable type of refrigerant flow controlling device may, of course, be adapted for use in connection with the present invention, the particular mechanism shown more or less diagrammatically at 19 in Fig. 4 including a compressor 19e driven by a suitable electric motor 19f and discharging refrigerant therefrom to a condenser 19g from which it is conveyed to a receiver 19h and thence to an expansion valve 20 which discharges the refrigerant therefrom into the tube 306, the refrigerant after having passed through the evaporators 3 and 4 and having been gasified being returned through the tube 38 to the suction side of the compressor 19e.

Any suitable or conventional type of control mechanism may be provided for controlling the operation of the motor 19f. The particular control indicated diagramamtically in Fig. 4 is of the thermostatic type including a control bulb 16 secured in contact with the suction tube 38 adjacent its point of connection with the evaporator 4 so as to prevent frosting of the suction line, a control switch indicated diagrammatically at 18 and controlled thereby and connected in series with the motor 19f and a suitable source of electrical energy. Preferably, the switch 18 is of the adjustable type having a control shaft 18a projecting to a point in advance of the evaporators 3 and 4 and there provided with a knob 18b for the purpose of enabling adjustment of the switch 18 to operate under varying temperatures within the cabinet 1.

The above described refrigerant circuit may be varied and the control for the ice freezing cups modified as shown in Fig. 6, where a special thermostatic valve in the suction passage leading from the evaporator around the ice cups 11 acts to stop and start refrigeration of the ice cups only without depending upon cyclic operation of the condensing unit. This valve includes a casing 27 having a cover 28. Intermediate the ends of the casing 27 a centrally apertured bowed diaphragm 34 is sealed at its edges to the casing 27 so as to divide its interior into two compartments. The diaphragm 34 is of metal and being bowed has the characteristic that when flexed over its central plane tends to snap into bowed position on the other side thereof. The marginal edges of the central aperture in the diaphragm 34 are bent upwardly to form a valve seat 35 and positioned above the valve seat 35 is a valve element 36 which is fixed and sealed to a pin 32 extending centrally through the central aperture in the diaphragm 34. Below the diaphragm the pin 32 has secured thereto a serrated crown stop 33 which will permit flow of refrigerant between it and the diaphragm 34 even though they are in contact with each other.

Although any suitable temperature responsive element such as a bellows, bi-metallic element or the like may be employed to operate the valve 35, as a matter of illustration only I have shown a strap 29 formed of a material having a high coefficient of expansion, such as zinc, secured at its opposite end to the cover 28 and at its center to the pin 32. The cap 28 is provided with an upstanding central tubular boss in which is threadably received a plug 31 between which and the strap 29 adjacent the upper end of the pin 32 a coil spring 30 is maintained under compression, the force of which may be varied by adjusting the plug 31. With this construction the liquid refrigerant from the expansion valve 20 is divided, one part thereof passing through the evaporator surrounding the cups 11 and discharging therefrom into the valve above the diaphragm 34, while the remainder of the refrigerant from the expansion valve may pass through a coil such as 37 to the suction line 38. The interior of the valve 26 below the diaphragm 34 is connected to the suction tube 38 beyond the coil 37. The coil 37 may be an evaporator of any suitable type employed for some purpose or other such as cooling the air in a refrigerator cabinet, or it may be a small capillary passage designed solely to restrict the flow of vapor, while allowing the desired amount of liquid refrigerant to pass through it. In addition to the coil 37 there may be some additional evaporator surface associated with the tube 38.

Assuming the valve to be in the position indicated in Fig. 6 and the refrigerating mechanism as being active, liquid refrigerant from the expansion valve 20 will flow through the evaporator around the cups 11 and into the upper end of the valve 26 and then between the valve 36 and the valve seat 35 into the lower part of the casing 27 and then to the suction tube 38, causing the cups 11 to be refrigerated. Under such conditions as the refrigeration of the cups 11 proceeds the refrigerant flowing into the valve 26 will become colder, causing the strap 29 to contract against the force of the spring 30 until such time as the pin 32 and consequently the stop member 33 will have been raised sufficiently to cause the diaphragm 34 to snap upwardly into contact with the valve 36 and thereby shut off the flow of refrigerant through the valve 26 and around the cups 11. As soon as this occurs all of the refrigerant flowing through the expansion valve 20 will be forced through the coil 37 to the discharge or suction tube 38 and, accordingly, the evaporation of refrigerant around the ice cups 11 will also stop or be retarded to a degree that will allow the ice in the cups 11 to melt loose from the cups. During this period the thermally responsive strap 29 will expand, due to the rise of temperature, and the valve 36 will push downwardly on its seat 35 under the force of spring 30. This force exerted upon the diaphragm 34 will increase gradually under the rising temperature within the space above the diaphragm 34 until the diaphragm snaps downwardly, opening the valve and reestablishing the process of refrigerating the ice cups.

The refrigerant has but one path back to the condensing unit while the valve shown in Fig. 6 is closed, but when it is open the refrigerant flows through two paths that are connected in parallel. The heat transfer relationships of the valve body 27, of the cover 28 and of the strap 29 are such that the time required for the valve to reopen after having stopped the refrigerating effect upon the ice cups will be ample to allow the ice frozen in the cups to melt loose and float upward in tank 2. During this melting period the flow of refrigerant around the ice cups will be negligible, due to the "dead-end" condition of this portion of the circuit.

A preferred arrangement, particularly for models having a greater number of ice cups, is shown in Fig. 7, where a dual thermostatic valve of design similar to that in Fig. 6 is used to alternate the freezing effect between two sets of ice cups. The action is similar, but when the valve closes the suction end of the evaporator around one set of cups a similar valve opens the suction end of a similar evaporator around another set of ice cups. In this valve mechanism there are two diaphragms 34, each having a valve seat 35, and there are two valves 36' and 36" on the stem 32'. The two valve seats 35 are on opposite ends of the tube 39, which is attached in a gas-tight manner to each of the two diaphragms and is provided with openings 40 to allow the refrigerant to flow into the space between the two diaphragms and thence out through the suction tube 38.

Assuming that the two evaporators associated with the two sets of ice cups have equivalent passages and heat transfer rates, it will be seen that this construction has an advantage over that shown in Fig. 6 in that the restriction to refrigerant flow is constant as between the two positions of the valve. It is thus possible to employ an additional evaporator in series with the assembly shown in Fig. 7, either ahead of it or after it, without having such additional evaporator affected to any appreciable degree by the cyclic operation of the thermal valve. The spring 30 may be omitted in the dual valve, since the stem 32' is moved positively in both directions. The stem 32' in Fig. 7 may be provided with threaded caps or nuts on each end for the purpose of making adjustments and to facilitate assembly. Such adjustments may be made without dis-assembling the valve if each cover 28 is provided with an opening for that purpose, or the connections for the tubes 41 and 42 are located in line with the stem 32'.

Still larger ice makers, having large numbers of ice cups may be operated with a valve similar to the one shown in Fig. 7 by connecting the evaporators in multiple as shown in the diagrammatic view Fig. 8. The two sets of ice cups may be in opposite ends of a large tank, or they may be alternately arranged as shown in Fig. 8. In such an ice maker the evaporators may be rigidly attached to the tank if desired. Another modification possible is to use the walls of the cups themselves to form one wall of the evaporating spaces, with a single sheet welded or soldered to the cups forming the other wall of the evaporating spaces.

Another design, providing for more positive and rapid melting of the ice blocks or rings loose from the cups is seen illustrated in Fig. 9, which also shows another means for actuating the reversing valve. It will be understood that the actuating means shown in Fig. 9 might be combined with the type of refrigerant circuit shown in Fig. 7, and that a valve actuated by the principle illustrated in Fig. 7 might be substituted for the valve shown in Fig. 9 while retaining the circuit as in Fig. 9.

In Fig. 9 the valve is shown in position for refrigerant flow as indicated by the solid arrows. The liquid refrigerant enters the valve through tube 43, passes through valve port 44 and thence through tube 45 to the set of ice cups 46, which are in the warming-up portion of the cycle. The liquid refrigerant now passes through the capillary tube 47, which retards its flow enough to cause evaporation in the evaporating spaces that are associated with the set of ice cups 48. The vapor then goes through the tube 49, the valve port 50 and the suction tube 51 to the condensing unit, not shown in this view.

In addition to the ice cups as shown before, this assembly includes two special ice cups 52 and 53, which may be attached to and opening into the same water tank as the other cups, may be connected with a small tank of their own, or may be individually sealed, each with its own water content. These cups are cooled in the same manner as the other cups, one with each of the two sets of cups. The evaporator coil 46' is connected with the refrigerant passage that serves the cups 46, while the coil 48' is connected in the circuit that cools the cups 48.

The cups 52 and 53 are differently proportioned from the other ice cups, preferably being smaller in diameter and deeper, with the evaporators arranged to cause freezing in the upper part of the cups first. Thus while rings of ice are forming in the set of cups 48 the ring of ice formed in cup 52 will become a solid plug or cone of ice 65, as shown, and the further, downward freezing of ice below this plug will produce pressure on the water in the bottom of the cup and in the tube 54 and chamber 55 as well as upon the diaphragm 56.

As the formation of ice 65 progresses in cup 52 the pressure upon diaphragm 56 will increase, finally causing the diaphragm 56 to snap into position 56', pushing the valve stem 57 and its valves 58 and 59 along their common axis until the valve 58 closes the port 50 and the valve 59 closes the port 44. At the same time the stem 57 engaging the diaphragm 60 will cause it to snap into position 60'. It will be seen that the high pressure of liquid refrigerant acting upon diaphragm 60 has been urging it in this direction constantly before this movement occurred, but the diaphragms are so designed that they will not snap into reversed position under the highest possible pressure of the liquid refrigerant. The higher pressure of the expanding ice is, however, ample to snap both of the diaphragms and to move the valve 59 against the pressure of the liquid refrigerant, aided by the liquid pressure that is already exerted upon diaphragm 60.

This movement of the valve stem and its valves has now opened the ports 61 and 62 simultaneously closing ports 44 and 50, which provides new paths for both liquid and gaseous refrigerant, as indicated by the broken line arrows. The inrush of warm liquid refrigerant through port 62 and tube 49 warms up the cup 52 and the series 48 of ice cups. Its flow is retarded by the capillary tube 47, through which refrigerant now flows in a reversed direction. The liquid refrigerant already in the evaporating spaces around cups 46 and cup 53 is now free to pass through tube 63 and port 61 to the suction tube 51, thus starting the refrigeration of the cups 46 and 53, which is continued with refrigerant which passes through the capillary tube 47.

The result is the melting free of the ice in cups 48 and 52 and a drop of pressure in the tube 54 and chamber 55, while ice is being formed in cups 46 and 53 preparatory to the next reversal of the valve mechanism, which will bring the operation back to the starting point of this description. The ice 65 in cup 52 will either free itself and float upwardly out of the cup like the other ice, or will remain in the cup and melt enough to reduce the pressure, according to whether the cup is connected with the bottom of a tank of water, or closed.

The tube 51 may lead to an additional evaporator for the purpose of cooling cabinet air, in which case no damage will result from a slight leakage of the valves which might allow refrigerant to "short-circuit" and pass from tube 43 through the closed valve port, 50 or 62, to tube 51. An alternative arrangement, calling for the crossing of tubes 54 and 64 and other detail modifications that will be self-evident, would be to employ closed containers of carbon dioxide or other very volatile fluid in place of the ice cups 52 and 53.

Various alternative methods of control may be used to produce the same effect of interrupting or alternating the refrigerating effect upon the cups or other surfaces upon which the ice is frozen in order that the ice will free itself from such surfaces and allow more ice to be frozen thereon. Among these alternatives I mention a few below.

The liquid refrigerant may be controlled by a metering device or a "load-and-fire" means such as a container and a float valve that allows a measured volume of liquid to pass at each cycle. Such means would accomplish the same result of providing periodic refrigeration to the ice making cups or surfaces upon which ice is frozen, allowing the ice to melt loose between the freezing periods.

An obvious variation of this would be to meter the vapor as it leaves the ice making cups and provide for stopping the refrigerating effect after a given volume of vapor had passed the meter. Certain types of meters, such as those employing the Pitot tube principle, would correct for vapor density, although this is not essential.

The refrigerant might be automatically weighed out in batches representing the desired number of heat units of refrigerating effect. Automatic devices capable of accomplishing these effects are well known in other arts and need not be described here.

Another alternative would be to employ a clock mechanism to cut off current or refrigerant at predetermined intervals of time. Such clock mechanisms or timing devices have been used in refrigeration, but so far as I am able to learn they have never been employed for this purpose except in my own experiments.

A typical form of ice ring 17, such as may be frozen in any of the apparatus thus far described, is shown in Fig. 10. It is to be understood that this ring, cup, truncated cone, disc or other shaped piece of ice may assume any shape that can be frozen upon a surface of the form selected. The ring or cup form is preferred over the plug or solid cone form made in cups 52 and 53 of Fig. 9 and in cup 11e of Fig. 15, as a given weight of ice is more rapidly frozen in a thin wall than in a solid block. The ring, cup and disc forms have the further advantage of being clear and free from strain cracks or "core" effect such as appear in blocks of ice like 17e in Fig. 15 and 65 in Fig. 9. Manufacturers of ice in the usual large blocks, weighing some three hundred pounds each in common practice, are faced with the necessity for artificially removing water from the core of the block in order to make the ice clear, but I am able to avoid the need for such an operation by stopping the freezing process before any crackled or clouded effect is produced. Impurities forced to the center or upward into the tank of water are not trapped and frozen into these cups or rings of ice made by my process, except as described in connection with cups 52 and 53 and as later described in connection with Figure 15.

My process has many variations, of which some are more desirable than others, and I prefer those that produce clear ice, particularly when the purpose is to supply ice for table use.

One of the alternative forms of my ice cup, making ice in cup form, is shown in Fig. 11 where the ice is indicated at 17a. This employs the bottom of the cup 11a as an ice-forming surface as well as the sides by extending the evaporator 3a around the bottom of the cup as well as the sides. It is possible to make these cup-shaped blocks of ice or the tapered rings as shown in Fig. 10 so that they nest together for the purpose of putting more ice into a given space or container, as when a considerable quantity of ice is desired in a drinking glass.

A similar cup of ice 17b may be formed on the outside of a metal cup 11b, as shown in Fig. 12, by inverting the cup in the bottom of the water tank and employing an evaporator 3b coextensive with the sides and bottom of the cup. The contour of the cup may be curved in any desired manner or shaped with steps or other designs, as long as the form does not prevent the freeing of the ice from the surface upon which it is frozen. Cups of this sort may be used in making very attractive desserts and other delicacies for the table.

Rings or open cones of ice 17c may also be frozen on the outside of a cup 11c as shown in Fig. 13. This method of freezing on an inverted cup avoids any danger of trapping foreign matter or minerals and also avoids the danger of freezing solid and producing the strain cracks that make cloudy ice. In this case the evaporator 3c is not extended into contact with the bottom of the cup 11c.

An example of a curved cup 11d is shown in Fig. 14. Such a cup may vary from a flat surface, making a ring or disc of ice 17d, to a deep cup, producing a tubular effect. In a shallow cup, freezing ice in a cup-like or disc-like shape, it is possible to freeze the entire cup full of ice or with ice extending above the top of the cup, without clouding the ice. This is also possible on a flat surface, or wherever the freezing does not produce pressure nor trap a core of water to be frozen last. In the particular case shown in Fig. 14 the evaporator 3d is shown as comprising a limited number of turns of a tube contacting the lower side portions of the cup 11d.

The very deep cup 11e shown in Fig. 15 might be used in connection with any of the control methods thus far described, but it is here shown for the purpose of illustrating another of the various methods which are available for use in connection with my process for freezing and storing blocks of ice in a tank of water. The process is similar to that explained in connection with ice block 65 in cup 52, Fig. 9, but in this case the pressure produced in the bottom of the cup 11e by the expansion of the ice 17e in freezing is employed directly to break the ice free from the cup by force. As explained before, this method is subject to the disadvantage that the ice not only freezes with a clouded core, but the great force exerted upon it causes the ice to crackle. The advantage is that no valve mechanism nor thermally actuated control need be employed. In using this method it is necessary to provide very smooth surfaces on the inside of the cups and to avoid any flexibility that might allow one side wall of the cup to move away from the ice and relieve the pressure before the entire ice block is forced to move.

There is some advantage in having a slight degree of flexibility in the portion of the cup containing water below the ice level, as this allows a greater thickness of ice to form before the pressure builds up to a breaking point. Without this lower flexibility the ice itself will break through one or more times before it is frozen to a thickness that will withstand the high pressure required to break the ice away from the walls of the cup. Since a spreading of one wall of the cup allows that side to break away without ejecting the ice and irregularities such as small dents may prevent the ejection, allowing the entire contents of the cup to freeze after the release of the pressure on the water below, I prefer the more positive methods previously described, or some provision for periodically melting loose any ice that has failed to eject from the cups, though all of these methods are within the scope of my invention and claims.

The very shallow cup 11f shown in Fig. 16 might also be used in a freezing and melting cycle as before described, but is used here to illustrate another alternative method of making the ice free itself from the surface upon which it is frozen. The cup 11f is made of a material having a very high coefficient of thermal expansion, as for instance, zinc. It is preferred that the water tank 2f be made of some material having a lower coefficient of expansion, such as iron. The drawing shows the condition after a disc of ice 17f has been frozen. The ice, although a better conductor of heat than water, has no convection currents and covers the refrigerated surface so that the next water to be frozen must give up its heat to the ice and this heat must be conducted a distance through the ice to reach the refrigerated surface. This retards heat transfer from the water to the evaporator, allowing the evaporator temperature and that of the cup to drop.

The metal of which the cup 11f is made contracts, but its rim can not contract due to its rigid attachment to the bottom of the tank 2f, hence the cup decreases in depth and the radius of curvature of the cup increases, causing the cup to break away from the ice that has been formed therein. This condition of breaking away is illustrated in the drawings. Ice can thus be caused to separate from the surface upon which it has been frozen and float to the top of the water in the tank. There are many variations of this method, using convex instead of concave freezing surface, using angular surfaces, using bimetal sheets, using zig-zag or bellows constructions, etc. It is of course possible to employ a flexible surface and deform it with a thermally produced fluid pressure change or thermal contraction of some solid other than the material of which the surface itself is made.

A second example of a method for employing a thermal change to break the ice loose is seen in Fig. 17, where the cup 11g is provided with a flexible bottom 66. The evaporator coil 3g is enclosed in a lower chamber formed by the additional cup 67, which is attached by welding or other fluid-tight manner to the cup 11g. The space surrounding the coil 3g within cup 67 is filled with material 68, which is preferably a cryohydrate having its freezing point well below that of water.

This material 68 is normally liquid, due to its low freezing point, and acts as a heat transfer medium between the flexible bottom 66 of cup 11g and the expansion coil 3g. The block of ice 17g is frozen almost completely as shown before any substantial portion of the liquid 68 is frozen, but as the thickness of the ice 17g increases, the temperature of the coil 3g will drop, due to the retarded rate of heat flow from water to coil 3g. This causes some of the liquid 68 to freeze upon the coil 3g and the expansion of this ice deflects the cup bottom 66 upward to the position here shown. This causes the ice block 17g to lift away from the cup 11g so that water enters between the ice 17g and the cup 11g in a film of sufficient thickness to complete the freeing of the ice 17g from the cup 11g.

When the ice block 17g floats out of the cup 11g there is a rush of water into the cup to replace the ice. This water is somewhat above 32° F., whereas the ice 17g has been cooled to a considerably lower temperature. While the bottom 66 of cup 11g is free of ice and while the first thin film of ice is forming after a finished block 17g has been ejected, there will be a very rapid heat transfer from cup bottom 66 to material 68, resulting in the melting of at least a part of the frozen portion of 68. This action can be assured by employing a small area on evaporator coil 3g, so that the rate of heat transfer from wall 66 to material 68 during the period of maximum heat absorption by wall 66 from the water will exceed the rate of heat transfer from the frozen portion of the material 68 to the evaporator 3g.

The bottom 66 is made with a normal spring tension that will maintain it in a position tending to compress the material 68, hence the bottom will follow the melting material 68 back to its original position. The ice film formed on bottom 66 during the melting of material 68 will not be thick enough to prevent the bottom 66 from going back to this original position. By a careful balance of heat transfer rates this method can be made to operate without any cyclic variation in the operation of the refrigerating system or the refrigerant circuit, but it is permissible to combine this type of cup with a cyclic system for the purpose of obtaining the combined effects of heat from incoming water and cessation of refrigerating effect to insure a more rapid melting of material 69 after the ice has been ejected.

Other variations would include putting the material 69 in a separate container, more removed from the ice freezing cup, somewhat as the cups 52 and 53 in Fig. 9 are removed from the diaphragms 56 and 60, which they actuate.

The method illustrated by Figure 18 is similar to that described in connection with Fig. 15, but the water is supplied under pressure at the bottom of the freezing chamber 69 and the ice is ejected in a continuous bar 70 until it strikes the surface 71 of stationary ice breaker 72 and a portion of ice 73 is broken off to fall into ice storage means 74. The cooling coil 3h acts in the usual manner, freezing ice at the lower extremity of ice bar 70. The ice line is indicated at 75 for conditions just after there has been an upward movement of ice bar 70. The ice formation continues to some lower limit as indicated at 75', which produces a high pressure on water contained in the chamber 76 and on check valve 77, holding it closed. When the pressure causes an upward movement of the ice bar 70 the pressure drops through a range of a few hundred pounds per square inch in chamber 76. The water in passage 78, on the other side of check valve 77 is under a pressure intermediate of the extremes of pressure in chamber 76, hence water is forced through the check valve 77 at this instant of pressure drop.

When the pressure has balanced between chamber 76 and the passage 78 the check valve 77 will close and the formation of ice at the lower end of bar 70 will continue. Several such small movements upward of ice bar 70 may occur before one of them causes the breaking off of a block of ice 73. Since a great pressure difference is available for moving the ice bar 70, it is not necessary to provide any great angle of taper in the ice chamber 69. Ice can in fact be ejected through a restricted opening, producing an ice bar by extrusion, in which process the ice becomes fluid under pressure.

In order to insure ample pressure on water supply in the passage 78 it is proposed to use a pump with two diameters of pistons, the larger piston being actuated by the available water pressure and the smaller one acting as a pump to force water into chamber 78. In this way a measured volume of water may be supplied at each movement of water through the check valve 77, while a part of the water is wasted. Means for accomplishing this are well known, so are not shown nor described in detail here. An advantage of the measured volume method is that accidental overflow of water in the event of failure of refrigerating effect is avoided.

Mention has been made of time controlled systems for interrupting the refrigerating effect, and one method of producing these interruptions is shown in Figure 19. The power supply conductors 80 and 81 furnish power both to the clock 82 and the motor 85, which drives the compressor of a refrigerating system. The conductor 80, which goes to one pole of the motor has a branch 80' going to the motor of the clock 82. The opposite pole of the clock motor is connected with conductor 81, which also leads to a time actuated switch 83 within the clock casing. When the switch 83 is closed by the clock the circuit through the conductor 84 and the motor 85 is completed. This circuit is periodically interrupted by the clock-actuated switch 83, as required for freezing ice and freeing it from the surface upon which it has been frozen.

Time controlled means for effecting changes in the refrigerant circuit or the circuit of other heat absorbing fluids as used in my process of ice making is illustrated diagrammatically in Fig. 20. An electrically operated valve 86, which may be similar to the valve assembly shown in Fig. 9, is connected with the leads 80 and 84 of a clock-controlled circuit such as shown in Fig. 19. As shown this valve will reverse the flow of refrigerant from that indicated by full line arrows to that indicated by broken line arrows, the same as in Fig. 9, but it is to be understood that an electrically operated valve may be used to duplicate the effects shown by Figs. 6, 7 and 8 and any other required change of flow in the refrigerating system or the system for heating to effect melting of ice free from the surfaces upon which it has been frozen.

When a refrigerating system is operated by some source of power that is also used for other purposes, or which can not be so conveniently stopped and started as an electric motor, it may be advisable to employ a time-actuated clutch or some mechanical means for varying the operation of the system. Such an arrangement is illustrated diagrammatically by Fig. 21, where the same clock-controlled electrical circuit operates the solenoid or magnetic device 87, which provides energy for engaging and disengaging the clutch 88 between the drive shaft 89 and the compressor 90 through the medium of connecting rod 91 and shifter lever 92, which is also shown in the clutch-releasing position 92'.

In Fig. 22 I have shown a typical ice cup 11j and the cooling coil 3j producing an ice ring 17j, but in addition this view shows an electrical heating coil 124 wound between the coils of cooling coil 3j. The intermittent heating of cup 11j by means of this heating coil 124 may be arranged either in conjunction with means for interrupting the refrigerating effect or independently of it, as desired, using thermal, time or other means for energizing the coil 124. The heating coil 124 is insulated electrically by the material 123 which separates it from the coil 3j and the cup 11j.

The similar arrangement in Fig. 23 shows a heating coil 93 of tubing in which a heating fluid is circulated under any suitable periodic control means for the purpose of melting ice rings 17k free from cup 11k. The use of this device will be obvious from previous descriptions.

A quite different mechanism, yet one operating under the same basic principle of this invention, is shown in Fig. 24, will also serve to illustrate in more detail the use of a tank such as I have indicated in outline in Fig. 8. This ice maker is intended mainly for use in large tanks, requiring ice production for cooling water in considerable volume. In such a system the shape of the ice blocks is not so important, as is the storage of a large quantity of ice. Although I here show ice being made in curved sheets on the periphery of a drum which forms the bottoms of large, shallow cups, it will be understood that cups or ice freezing surfaces of other forms might be used in this apparatus, as well as in those previously described herein.

The tank 2l in Fig. 24 is provided with lower portion 94, designed to partially house the ice-making wheel or drum 95, which is free to rotate upon the fixed, tubular shaft 96. As will be seen later, the wheel is supplied with driving power independently of any external motor or power means, but may be power driven if so desired. Refrigerating effect is supplied to the interior of the drum 95 by means of the refrigerant tube 43 which enters the fixed tubular shaft 96 at one end and passes through a wall of tube 96 to evaporating coil 97. The opposite end of coil 97 connects with suction tube 51, which passes back to the interior of tube 96 and out to the condensing unit. The tube 96 is attached in a rigid and fluid-tight manner to the side walls of tank 2 and the tubes 43 and 51 are brazed or otherwise attached in a fluid-tight manner to the tube 96 where they pass through the walls of this tube.

From the above it will be seen that the evaporator 97 is fixed with relation to the stationary tube 96 to which it is attached by means of the cradle or frame 98 and the hangers 99. In the drawing these hangers 99 should not be confused with the spokes 100 of the drum 95, whose hub 101 is free to rotate upon the tube 96. The outer shell 102 of drum 95 is provided exteriorly with longitudinal ribs 103 and circumferential ribs 104, making a number of cups 105 upon the outer wall of the drum. It will be noted that the ribs 103 and 104 are insulated with an air space or otherwise from the shell 103 so that ice will not form over the tops of these ribs.

Water is maintained within tank 2l at a level near its top as indicated by water level 106, hence water fills the lower portion 94 and completely surrounds the drum 95. Water is prevented from entering the interior of drum 95 by two means; first by the fact that the ends of drum 95 are sealed to the hubs 101, which in turn fit reasonably close on the tubular shaft 96, and second, by the fact that the interior of drum 95 is already filled with brine 107 up to the level 108 and above this level with air. The evaporator 97 and the brine 107 remain in the lower portion of drum 95 and serve to cool the shell 102 where it is contacted by the brine, while 100, 101, 102, 103, 104 and 105, comprising the drum 95 are free to revolve.

The operation of this structure is as follows, starting with water in tank 2l and the coil 97 cooled by an external refrigerating machine, not shown. The coil 97 cools the brine 107, which cools the shell 102 on its lower half, causing ice to form in the cups 105. Since the starting up of the system will cool the end of coil 97 next to the incoming tube 43 before the balance of the coil is cooled, there will be some ice frozen on the outer wall 102 adjacent to the first portion of coil 97 before it is frozen adjacent to the opposite end of coil 97. This will be automatic, but can be accentuated by adjusting the refrigerant supply by means of an expansion valve or otherwise to insure freezing more ice on one side of the drum.

After starting in this manner with the formation of more ice on the right hand side of drum 95 than on the left hand side the process will continue as follows: The thicker ice will provide greater buoyancy on the right hand side of drum 95, causing this side to move upward, rotating the drum counterclockwise as viewed in Fig. 24. When this rotation raises a few of the cups 105 above the level of the brine on the inside of drum 95 the ice in these cups will not only have been removed from its source of refrigeration, but will be surrounded by water that is warmer than the water confined between the drum and the portion 94 of the tank. Ice blocks 17l, shown floating in tank 2l are thus loosened from the drum as indicated at 110.

At position 111 a thin film of ice forms in the bottom of the cups 105, growing thicker as the drum rotates to position 109, where the freezing has stopped and the process of melting the ice free has started. This keeps a thicker wall of ice on the up-going side of the drum than on the down-going side and the thicker wall causes the drum to move upward on that side.

Power driven means for accelerating this rotation, or for regulating it to a slower speed may be provided if desired for the purpose of regulating the thickness of the ice formed. By means of a variable speed motor or transmission the operator can vary the ice thickness at will. An alternative is to use an escapement similar to a clock movement to hold back on the drum rotation. A geared-up flywheel and friction-centrifugal governor driven by the drum itself is another obvious alternative.

Should it be desired to drive the drum faster than the ice formation will drive it, a very small electric motor geared down to a slow moving pawl and ratchet device will provide ample power, as the main power required is to overcome bearing friction. In case it is desired to retard the rotation, to form thicker ice than would be obtained by free rotation, a ratchet device designed to hold the drum from rotating might be periodically released by a clock motor to allow the drum to move forward one notch at the end of each interval of time for which the clock mechanism is set. For the purpose of connection with the drum 95 either to drive forward or to hold back, a shaft forming an extension of hub 101 at the end opposite that at which tubes 43 and 51 are led out through tube 96 will provide an external shaft connected with the drum. Thus the extension of hub 101 will be carried by a bearing attached to tank 2l, while the tube 96 will attach to the opposite wall of tank 2l in a rigid manner.

An alternative form of drive or retarding connection would be to attach a sprocket wheel to the drum 95 inside of the tank and connect this sprocket wheel by means of a chain to a shaft above the tank. Similarly a ratchet wheel inside of the tank, attached to drum 95 could be actuated by a pawl connected with a rod leading up through the top of the tank to the clock or motor mechanism.

Water is supplied to the tank 2l by the pipe 112, leading from the tank 113, in which the float 114 controls the valve 115 to maintain the water level by regulating the supply of water from the pipe 116. Cold water leaves the tank through the screen 117 and the pipe 118, whence the pump 119, driven by the pulley 120 forces the water through the pipe 121 to the drinking fountains, air-conditioning spray chambers or whatever devices may require cold water. Any water returned after circulation is delivered by the pipe 122 to the tank 113 or direct to tank 2l.

Attention is directed to the fact that the brine inside of drum 95 is equivalent to the cooling element in contact with an external surface of the water tank as illustrated in other drawings. It would be possible to employ liquid or ice as the external contact with the ice freezing cups of these other drawings. A liquid contacting a metal wall may be considered a "surface" or a "cooling element" within the meaning of this specification.

In some of my descriptions it is necessary to visualize a combination of the disclosed elements from two or more of my drawings. An example is the means in Fig. 9 for varying the refrigerant pressure on cups or the evaporators around the cups. This might be combined with a cup having a flexible wall as 66 of Fig. 17, and the refrigerant itself might fill the chamber 68, in the manner described in connection with Fig. 8. Thus I have shown all the elements of a system in which variations of refrigerant pressure are automatically produced on the outer wall of a cup having a flexible wall, thus using such variations to flex the wall upon which ice has been frozen and break it loose sooner than heat alone would free it.

Where I speak of ice "floating" away from the surface upon which it has been frozen, or "floating" in the water or other liquid being frozen, it will be understood that the ice will float upward toward the surface of water and aqueous mixtures, but in the meaning of the word as used herein, may "float" downward in the case of some liquids that congeal into solids that are heavier than the liquids. In such a case it might be found desirable to locate the freezing cups or surfaces near the liquid level instead of near the bottom of the tank. Nothing herein is to be construed as limiting the application of my invention to constructions in which the ice is frozen at or near the bottom of the tank, as it may sometimes be found advisable to locate the ice cups in the side or end walls of a tank, or the ice freezing surface might be suspended in the middle of a tank.

From the foregoing description it will be seen that there are several methods and combinations of methods included in my invention, which may be described in general as the process of freezing ice on a submerged surface and then causing it to break loose from that surface as a result of natural forces rather than of separately applied power and float away from it, although some of my variations, such as the extrusion method, do not require that the ice "float" away from the freezing surface. It might break off and drop into a container if arranged to strike an angular surface when extruded a given distance. In such a case the water supply would come from the bottom of the cup under some pressure, with a check valve in the line and preferably a spring or metering means to insure that water follows the ice at each extruding movement.

Energy is stored up in one or both of two ways during the freezing of water or an aqueous mixture by my method. First; the expansion of the ice in freezing displaces some water and provides buoyant energy capable of lifting the ice to floating position at the water level. Second; the expansion of the ice on its lower side after a solid plug has been formed as shown in Figs. 9 and 15 produces a much greater force, but one that is effective through a much smaller distance. These two kinds of stored energy are resultants of the ice expansion and may both act on the same block of ice.

In the case of a liquid which increases in density when frozen, the energy made available for moving the solidified mass is gravity, as is less directly the case of buoyancy mentioned above, but the frozen mass goes down instead of up. This is included under the definition of "stored" energy as used herein, although it might more properly be called "released" energy.

It will, of course, be obvious, and I wish to emphasize the fact that this application is not limited to the exact structures and methods of control and operation described herein, but is intended to serve as a disclosure of a representative few of the many ways in which my invention may be used.

Formal changes may be made in the specific embodiment of the invention described without departing from the spirit or substance of the broad invention, the scope of which is commensurate with the appended claims.

It is claimed:

1. In combination, a water container having a pair of separate wall areas, a refrigerant evaporator associated with each of said areas, said evaporators being connected in parallel in a refrigerant circuit, and thermally controlled valvular means for alternately closing first one and then the other of said evaporators to the flow of refrigerant therethrough.

2. In combination with a refrigerant circuit, a pair of water container wall areas, heat exchangers associated with each of said areas, a refrigerant control device connected between said heat exchangers, said heat exchangers being connected in series in said circuit, and means for periodically reversing the flow of refrigerant through said heat exchangers.

3. In combination, a water container, an externally pocketed drum rotatably mounted and wholly submerged therein, and means for refrigerating the lower portion of said drum only including a cooling element disposed within said drum and mainly within the lower portion thereof, and means for circulating a refrigerant through said cooling element.

4. The process of providing a supply of ice comprising introducing water into a tubular receptacle, cooling said water to a temperature below its normal freezing point whereby to cause a wall of ice to be formed across said tube, limiting movement of said water in one direction in said tube and continuing cooling of said water until the pressure generated in said tube by the formation of additional ice under said wall of ice extrudes a mass of ice from the unrestricted end of said tube and temporarily releases said pressure, introducing more water into the confined space before the pressure produced by cooling has had time to build up again, and continuing the cooling process until pressure is again built up and the process repeats itself.

5. In the artificial production of ice, the steps of refrigerating a surface submerged by a liquid to be frozen until ice is formed thereon, employing the difference in density between the ice and the liquid to move the ice and the surface upon which it is formed for the purpose of raising its temperature and melting the bond between the ice and surface so that the ice will leave the surface, and returning the surface to the original position to repeat the process.

6. In a refrigerating system, in combination, a container for liquid, a freezing surface located below the normal level of liquid in said container, means for refrigerating said surface so as to cause ice to be formed thereon in separate masses within said container, and automatic thermally actuated means for freeing said surface of the ice thus formed so that the ice may float away from the surface and leave it free for repetition of the process.

7. Ice making means comprising, in combination, a wall having a surface thereof covered by a liquid to be frozen, means for cooling said surface to a degree sufficient to cause ice to be formed thereon at separate spots, thermally actuated means for causing the ice thus formed to leave said surface, and means for automatically initiating the freezing of additional liquid on the same surface.

8. In an automatic ice maker, in combination, a water tank, a refrigerating system including an evaporator cooperatively associated with a wall of said tank so as to cause ice to be formed on an inner surface thereof, and thermally actuated means operable to periodically interrupt the refrigerating effect of said evaporator whereby to permit said ice to melt free from said surface.

9. In an ice maker of the type herein described having ice making surfaces, a refrigerating system connected to cool said surfaces for the purpose of making ice on said surfaces and to warm them for the purpose of freeing ice therefrom, a tank for the storage of water to be frozen and of ice that has been frozen, and a thermostat for controlling the refrigerating effect produced by said system, said thermostat being influenced by temperature changes of said tank and its contents.

10. In an ice-maker, a plurality of normally constantly submerged wall areas and means for forming ice on said areas in rotation including refrigerating means and control means for said refrigerating means acting to refrigerate said areas in rotation, the whole being so constructed and arranged that ice is freed from said areas during their respective inactive periods.

11. In a refrigerated cabinet, in combination, a food storage compartment, and means for transferring heat downwardly in said compartment by freezing ice therein and releasing it to float upwardly in a liquid.

12. In an ice-making system, an enclosure for ice and water, a metal wall forming a part of said enclosure, and cooling means arranged to removably contact one side of said wall on a plurality of separate areas for the purpose of forming separate pieces of ice on the corresponding areas on the opposite side of said wall.

13. An ice making refrigeration system comprising, in combination, a tank adapted for the storage of water and ice and provided with surfaces for contacting parts of said system in heat exchange relationship therewith, means for supporting said tank in such heat exchange relationship and in a manner to allow removal of the tank from other parts of said system while maintaining the refrigerant containing parts of said system in their normal gas-tight state, and means for producing ice in relatively small pieces and freeing such ice in a cyclically controlled sequence and storing said ice in said tank.

14. The method of producing a supply of ice comprising individually refrigerating a plurality of separate areas while contacted by a freezable liquid until substantially separate masses of said liquid are frozen thereon, freeing said masses of frozen liquid intact from said areas displacing them therefrom, and effecting controlled cyclic repetition of the aforementioned steps as a result of a condition automatically created by a demand for additional refrigerating effect.

15. The method of providing a supply of ice comprising refrigerating a surface covered by a liquid so as to cause a mass of ice to form thereon, causing said mass of ice to be freed from said surface by a thermal condition, removing said ice from proximity to said surface, and applying power to effect automatic cyclic repetition of the aforementioned steps.

16. The method of producing a supply of ice including refrigerating a surface submerged by a freezable liquid until a material amount of said liquid less than the whole thereof has been frozen on said surface, discontinuing refrigeration of said surface until said frozen liquid has melted free and floated away therefrom, and applying power to effect automatic cyclic repetition of the aforementioned steps as a result of temperature changes.

17. The method of producing a supply of ice including first refrigerating a surface wetted by a freezable liquid until a material amount of said liquid has been frozen thereon, then heating said surface whereby to melt said frozen liquid free therefrom and to permit it to leave said surface, said method including the application of power to effect cyclic repetition of said steps in response to the effects produced thereby.

18. The method of producing a supply of ice including refrigerating a surface covered by a freezable liquid until a material amount of said liquid less than the whole thereof has been frozen on said surface, then heating said surface to free said frozen liquid therefrom, moving it away therefrom, and cyclically applying power to effect repetition of the aforementioned steps as a result of temperature change resulting from the freezing and freeing of said liquid on and from said surface.

19. In combination, a liquid container, a refrigerant evaporator arranged in heat absorbing relationship with respect to the exterior surface of a submerged wall area thereof, a refrigerating system including said evaporator, control means for causing cyclic operation of said system, and thermal means acting in response to said control means during non-freezing periods of said evaporator for freeing frozen liquid from said wall area.

20. In an ice making system, means adapted for guiding the flow of refrigerant therethrough, means for changing the refrigerant flow in said system, and cyclically actuated means controlling the second said means, the whole being so constructed and arranged that ice is first frozen simultaneously into a plurality of relatively small substantially separated pieces and then automatically released during different cyclic phases of said system.

21. In combination, a refrigeration system, a liquid container, evaporator means connected in said system and co-operating with said container to withdraw heat from a submerged surface thereof whereby to freeze a portion of said liquid below the surface thereof, a power element, and means operable thereby to cause said system to discontinue the withdrawal of heat from said surface after a material amount of said liquid less than the whole has been frozen thereon and to repeat said steps only after the lapse of a sufficient period of time to permit said frozen liquid to melt free from said surface and float away in said liquid from close proximity to said surface.

22. The process of freezing water to form ice comprising cyclically refrigerating a submerged wall area of a water containing tank thereby to produce ice in separate pieces upon said wall area, freeing said ice from said wall area whereby to permit it to float away from said wall area in said water, allowing at least a portion of the ice thus formed to remain in said water to cool the same, and effecting cyclic repetition of the aforementioned steps under control of effects caused by the formation and releasing of ice, re-freezing at least a portion of the water produced by the melting of said ice in cooling said water.

23. The method of providing a supply of ice comprising the steps of refrigerating a surface submerged in water until ice is formed on said surface in separate pieces, melting the ice free from said surface whereby to permit it to float upwardly in said water away from said surface, and while the ice first formed is melting in said water, effecting cyclic repetition of the aforementioned ice forming and ice freeing steps by a control method regulating the formation of a predetermined amount of ice on said surface.

24. The method of providing a supply of ice comprising refrigerating a submerged wall of a tank containing a liquid to be frozen in separate pieces, causing the ice thus frozen to leave said tank wall and float in the unfrozen portion of the liquid, and effecting cyclic repetition of the aforementioned ice forming and ice freeing steps by a control method regulating the formation of a predetermined amount of ice on said wall.

25. In an ice making machine, in combination, a water tank, means for refrigerating a submerged surface of said tank to cause ice to form thereon, means for releasing said ice from said surface, a power element, and means operated thereby for rendering the first two mentioned means alternately operative.

26. In an automatic ice making system, means for progressively freezing, freeing, melting and re-freezing the same water, control means for said system regulating its operating cycles, whereby to maintain an unfrozen portion of said water in a cooled condition, and a power source for actuating said control means.

27. In an ice making system, a cold water supply tank, cyclically operative means for freezing a portion of the water stored in said tank and moving it to storage, control means so constructed and arranged as to regulate the length and frequency of operation of the first said means, and a source of energy for actuating said control means.

28. A refrigerating system, an automatic ice maker of the type herein described arranged to be refrigerated by said system and including a plurality of evaporator elements, the said elements being connected in parallel in a refrigerant circuit of said system, and a power element for effecting cyclic control of said ice maker.

29. The method of producing a supply of ice by means of a tank containing water, including the steps of refrigerating a first group of separate areas of a submerged wall of said tank and simultaneously heating a second group of separate areas of a submerged wall of said tank, discontinuing said refrigeration of the first mentioned group of surfaces after the lapse of a time interval sufficient to produce a layer of ice of desired thickness over each of said areas and simultaneously discontinuing heating said second group of areas, then heating said first group of areas whereby to release said ice therefrom and simultaneously refrigerating said second group of areas for a period of time sufficient to produce a layer of ice of desired thickness over each area of said second group, and continuously repeating said steps of operation in the sequence stated.

GLENN MUFFLY.